(12) United States Patent
Leiser et al.

(10) Patent No.: US 7,399,375 B2
(45) Date of Patent: Jul. 15, 2008

(54) CONNECTING CONDUITS TO COMPONENTS OF FLUID HANDLING DEVICES

(76) Inventors: Judson Leiser, 6200 SW. Arbor Grove Dr., Corvallis, OR (US) 97333; Eric S. Dod, 4311 NW. Elmwood Dr., Corvallis, OR (US) 97330; Shell Whittington, 6665 NW. Niagara Pl., Corvallis, OR (US) 97330; Karen St Martin, 38880 Golden Valley Dr., Lebanon, OR (US) 97355

( * ) Notice: Subject to any disclaimer, the term of this patent is extended or adjusted under 35 U.S.C. 154(b) by 581 days.

(21) Appl. No.: 11/013,601

(22) Filed: Dec. 15, 2004

(65) Prior Publication Data

US 2006/0124178 A1 Jun. 15, 2006

(51) Int. Cl.
*B29C 65/00* (2006.01)

(52) U.S. Cl. .................. 156/272.8; 156/272.2; 156/293; 156/294; 156/296

(58) Field of Classification Search .............. 156/272.2, 156/272.8, 293, 294, 296; 219/121.6; 137/590
See application file for complete search history.

(56) References Cited

U.S. PATENT DOCUMENTS

| 4,694,136 | A | | 9/1987 | Kasner et al. |
| 4,694,137 | A | | 9/1987 | Hawkins et al. |
| 4,768,266 | A | * | 9/1988 | DeYoung .................. 29/25.35 |
| 5,137,013 | A | | 8/1992 | Chiba et al. |
| 5,286,946 | A | | 2/1994 | Will |
| 6,409,863 | B1 | * | 6/2002 | Williams et al. ............ 156/198 |
| 6,554,929 | B2 | | 4/2003 | Lee |
| 6,596,122 | B1 | * | 7/2003 | Savitski et al. ........... 156/304.2 |
| 2003/0141009 | A1 | | 7/2003 | Landherr et al. |

* cited by examiner

*Primary Examiner*—Jeff H. Aftergut
*Assistant Examiner*—Daniel McNally

(57) ABSTRACT

A component of a fluid handling system has a wall that separates an interior of the component from an exterior of the component. A channel passes completely through the wall for receiving a conduit therein. A trough is formed on an exterior of the component. A sidewall of the trough has an opening that aligns with the channel. The opening is for receiving the conduit therethrough before the channel receives the conduit.

5 Claims, 9 Drawing Sheets

CONNECTING CONDUITS TO COMPONENTS OF FLUID HANDLING DEVICES

BACKGROUND

Many fluid handling systems include a fluid reservoir that supplies fluid to a fluid dispensing (or ejection) device using conduits connected between the fluid reservoir and the fluid dispensing device. Such systems can be found in printers in the form of an ink reservoir connected to a print head, medical devices in the form of a fluid supply connected to a catheter, etc. The conduits are often connected to the fluid reservoir and the fluid dispensing device by conduit connectors or fittings respectively attached to the reservoir and the dispensing device. The connectors are attached to the reservoir and the dispensing device by welding, threading, or the like or are formed integrally with the reservoir and the dispensing device.

Connecting a connector to a conduit usually involves pressing the conduit over the connector so that the connector extends into an interior of the conduit and forcibly engages the interior of the conduit. However, such connections may occupy an undesirable amount of space, especially when connecting several tubes between the reservoir and dispensing device. For example, many color printers have a conduit for each ink color connected between a stationary multi-color ink reservoir and a print head that moves over a printable medium for disposing images thereon. Moreover, many printer manufacturers are decreasing the size of their printers, e.g., meaning smaller print heads and ink reservoirs, and increasing the number of ink colors, e.g., meaning more conduits and conduit connections.

For some applications, such as heat exchanger applications, conduits have been laser welded directly to a header or a reservoir. However, many of these applications do not account for the dynamic forces involved with a moving fluid dispensing device, such as a print head, connected to a stationary reservoir.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
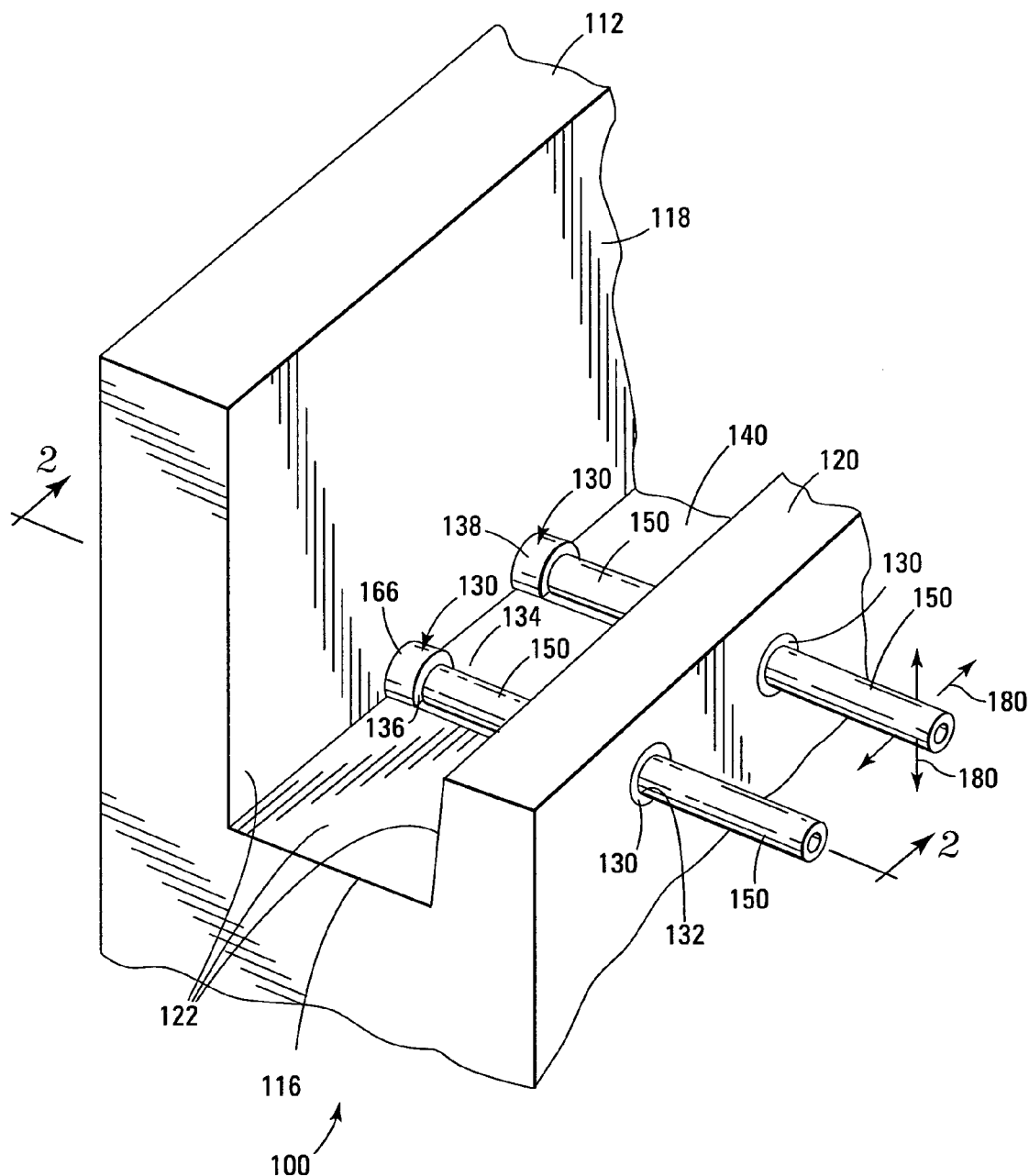
FIG. 1 an isometric view of a portion of a component of a fluid handling system, according to an embodiment of the present invention.
Figure 2:
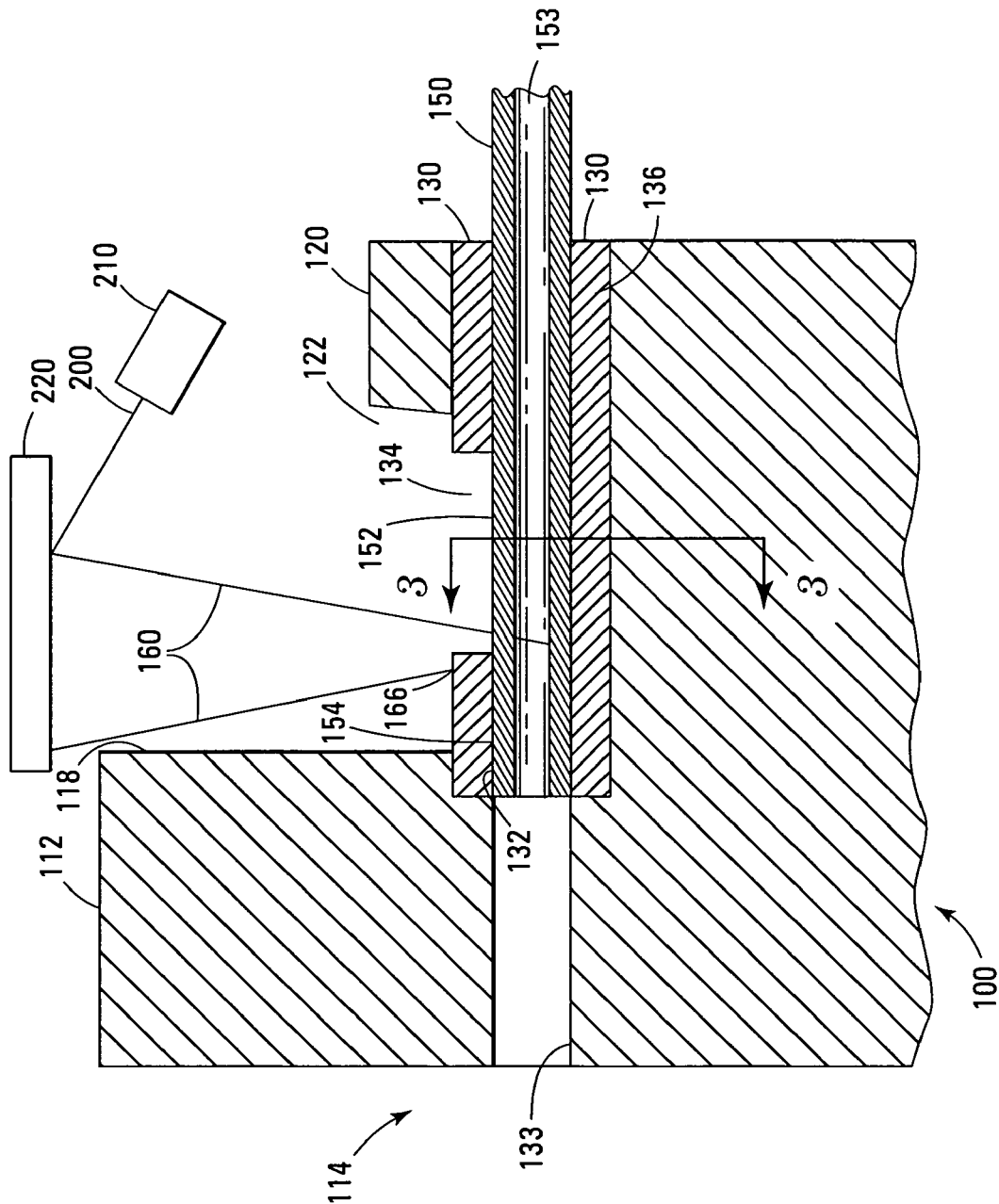
FIG. 2 is a cross-section of the component of FIG. 1 viewed along line 2-2 of FIG. 1.
Figure 3:
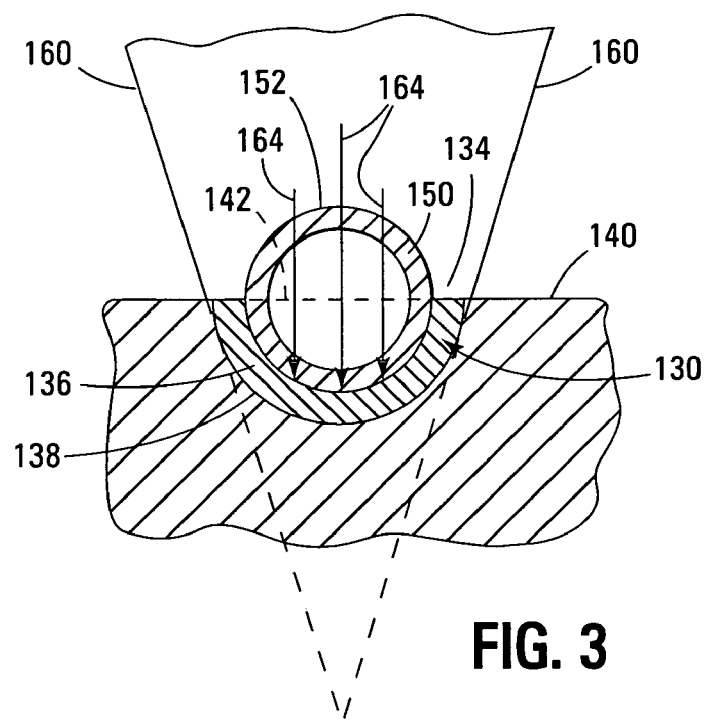
FIG. 3 is a view taken along line 3-3 of FIG. 2, according to another embodiment of the present invention.

FIG. 1 is an isometric view of a portion of a component 100 of a fluid handling system, according to an embodiment of the present invention. FIG. 2 is a cross-section of component 100 viewed along line 2-2 of FIG. 1. FIG. 3 is a view taken along line 3-3 of FIG. 2, according to another embodiment of the present invention. The fluid handling system may be of an imaging device, such as a printer, a medical device, e.g., for dispensing medicines, etc. Component 100 may be a fluid reservoir, such as an ink reservoir, or a fluid-dispensing (or ejection) device, such as a print head. For one embodiment, component 100 is of a molded plastic that is transparent to light, e.g., wavelengths of 532 nm and/or 808 nm, such as polyethylene, polypropylene, or the like. However, component 100 is not limited to plastics that are transparent to light, but can be of plastics that absorb light, such as NORYL, a modified polyphenylene oxide-styrene.

Component 100 includes a wall 112 that separates an interior 114 (shown in FIG. 2) of component 100 from an exterior of component 100. For one embodiment, wall 112 contains a fluid, such as ink, within interior 114. As shown in FIG. 1, for one embodiment, a step (or shelf) 116 protrudes substantially perpendicularly from an outer surface 118 of wall 112 and terminates at a wall 120 that extends substantially perpendicularly from step 116 in substantially parallel opposition to wall 112. Wall 112, wall 120, and step 116 define an open channel (or trough) 122 on the exterior of component 100, as shown in FIGS. 1 and 2, where wall 120 is a first sidewall of trough 122, wall 112 separates the interior 114 of component 100 from an interior of trough 122 and acts as a second sidewall of trough 122, and step 116 forms a base (e.g., bottom wall) of trough 122. One or more sleeves 130 pass completely through wall 120 and are substantially perpendicular thereto, traverse trough 122 substantially laterally, and extend substantially perpendicularly into wall 112, as shown in FIGS. 1 and 2. For one embodiment, walls 120 and 122 taper toward each other in a direction toward step 116.

For another embodiment, a longitudinal bore 132 of each of the sleeves 130 aligns with a corresponding internal channel (or fluid flow passage) 133 that passes completely through wall 112, as shown in FIG. 2. For one embodiment, a sleeve 130 is coaxial with at least a portion of internal channel 133, as shown in FIG. 2. For another embodiment, each of sleeves 130 passes completely through wall 112 and is coaxial with its corresponding internal channel 133. As shown in FIGS. 1-3, a longitudinal slot 134 passes completely through a wall 136 of sleeve 130 and opens into longitudinal bore 132 of sleeve 130. For one embodiment, slot 134 is contained within trough 122, i.e., between walls 112 and 120, as shown in FIGS. 1 and 2.

As shown in FIGS. 1 and 3, each of sleeves 130 is partially embedded in step 116 or the base of trough 122. More specifically, a portion of an exterior surface 138 of sleeve 130 protrudes from a surface 140 of step 116 (and/or from the base of trough 122) and is exposed, whereas another portion of exterior surface 138 is embedded within step 116. For one embodiment, slot 134 extends to surface 140 of step 116, as shown in FIGS. 1 and 3. For another embodiment, surface 140 substantially coincides with a diameter 142 of sleeve 130, as shown in FIG. 3, and thus substantially half of each of sleeves 130 is embedded within the base of trough 122. For this embodiment, slot 140 extends about one half of the way around the circumference of each of sleeves 130, as shown in FIG. 3.

For one embodiment, each of sleeves 130 is formed from a plastic that is an absorber of light, e.g., wavelengths of 532 nm and/or 808 nm, such as NORYL, colored polyethylene or polypropylene, or the like. For another embodiment, component 100 is formed using a two-shot injection molding process, with a first shot of the molding process forming a bulk portion of component 100, e.g., walls 112 and 120, step 116 etc., and a second shot forming sleeves 130. For other embodiments, sleeves 130 are pressed into component 100.

As shown in FIGS. 1-3, a conduit 150 is inserted into each of sleeves 130 such that an exterior 152 of conduit 150 (FIGS. 2 and 3) engages an interior portion of sleeve 130 and such that a fluid flow path 153 of conduit 150 aligns with internal channel 133 of component 100 and opens into internal channel 133, as shown in FIG. 2. For one embodiment, conduit 150 is coaxial with sleeve 130 and internal channel 133, as shown in FIG. 2. For another embodiment, conduit 150 is of a plastic that is substantially transparent to light, such as polyethylene, polypropylene, or the like, and thereby can pass light, e.g., wavelengths of 532 nm and/or 808 nm, therethrough.

Note that slot 134 exposes a portion of exterior 152 of conduit for accessing conduit 150. For another embodiment, slot 134 exposes about one half of the circumference of conduit 150, as shown in FIGS. 1 and 3. For another embodiment, conduit 150 terminates within wall 112, as shown in FIG. 2, whereas for other embodiments conduit 150 can pass completely through wall 112. During operation, fluid flows to and from the interior 114 of component 100 via conduit 150 and channel 133.

For another embodiment, longitudinal bore 132 of sleeve 130 tapers in a direction from wall 120 toward wall 112 such that the interior portion of sleeve 130 engages exterior 152 of conduit 150, e.g., in a slight press fit adjacent to where sleeve 130 extends into wall 112, i.e., in region 154 in FIG. 2. This facilitates insertion of conduit 150 into sleeve 130 by limiting friction between sleeve 130 and conduit 150 to region 154. As discussed below, this further facilitates welding, e.g., laser welding, of sleeve 130 to conduit 150 in region 154 using a beam of light, such as a laser beam, so that a fluid-tight seal can be formed between sleeve 130 and conduit 150 around exterior surface 152 of conduit 150 in region 154.

Conduit 150 is welded, e.g., laser welded, to sleeve 130 using a light beam 160, such as a laser beam, (shown in FIGS. 2 and 3). As used herein the term "light" refers to any applicable wavelength of electromagnetic energy. In certain implementations, for example, laser generated light having wavelengths of between about 500 nm and 1000 nm may be used. For one embodiment, light beam 160 is directed into trough 122, as shown in FIG. 2. For another embodiment, light beam 160 is formed by reflecting a light beam 200 from a light source 210 off a reflector 220, such as a mirror. For various embodiments, light source 210 may be a laser, a laser diode, etc. Trough 122 provides direct access to the portion of exterior surface 138 of a sleeve 130 protruding above the base of trough 122 for the light.

For another embodiment, light beam 160 is focused so that the beam width is at least as wide as sleeve 130, as shown in FIG. 3. For this embodiment, a portion the light passes substantially radially through slot 134 of sleeve 130 and through conduit 150 and impinges on a portion of an interior surface of sleeve 130 substantially opposite slot 134, as indicated by arrows 164 in FIG. 3, and is absorbed by sleeve 130. As portion of the light passes through slot 134, another portion of the light impinges on an exposed portion 166 of exterior surface 138 of sleeve 130 that is located between an end of slot 134 and wall 112, as shown in FIGS. 1 and 2, and sleeve 130 absorbs the light.

The light absorbed by sleeve 130 heats sleeve 130 to its melting point, producing molten sleeve material. Moreover, this heat causes localized melting at the exterior surface 152 of conduit 150, producing molten conduit material adjacent the exterior surface 152. This results in intermixing between the molten sleeve material and the molten conduit material at an interface between the sleeve and conduit, which when solidified welds the conduit to the sleeve.

Note that the slot 134 and the transparency of conduit 150 facilitate welding of the sleeve to the conduit at locations beneath surface 140 of step 116, while directing light beam 160 at exposed portion 166 of sleeve 130 substantially simultaneously forms a weld above the surface 140. This acts to produce a continuous weld between the sleeve and conduit around the perimeter of the conduit, thereby forming a fluid-tight seal between the sleeve and conduit in the region 154 of FIG. 2. The fluid-tight seal seals against liquids and gases, e.g., air that could flow from the exterior to the interior of the component when the interior is at a vacuum pressure. Moreover, when the conduit is welded within the sleeve, the sleeve secures the conduit to the component.

During welding, light beam 160 may be moved longitudinally along slot 134. Varying the intensity of the light and/or the rate of longitudinal movement of the light can control the amount of melting of the sleeve and/or the conduit and thus the integrity of the weld.

Figure 4:
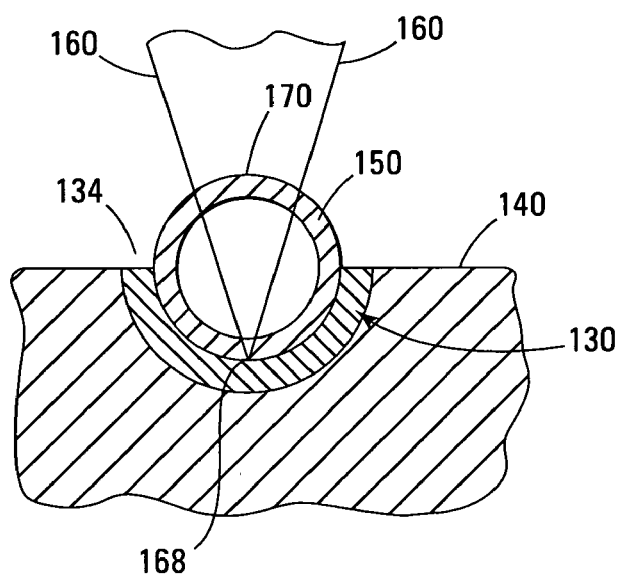
FIG. 4 illustrates welding of a sleeve to a conduit, according to another embodiment of the present invention.

For another embodiment, as shown in FIG. 4, light beam 160 is passed through slot 134 and is focused such that its focal point 168 is at the interface between sleeve 130 and conduit 150 at about 180 degrees around the circumference of conduit 150 from a center 170 of slot 134. When light beam 160 is moved longitudinally along slot 134, a weld is formed between sleeve 130 and conduit 150 at the focal point 168. Also, heating of sleeve 130, due to the absorption of the light by sleeve 130, causes welding of sleeve 130 to conduit 150 around the portion of perimeter of conduit 150 that is below surface 140. Positioning light beam 160 so that the light impinges on the exposed portion 166 of exterior surface 138 of sleeve 130 as the light passes through slot 134, as shown in FIG. 2 and described above, acts to produce a continuous weld between the sleeve and conduit around the perimeter of the conduit, thereby forming a fluid-tight seal between the sleeve and conduit in the region 154.

For some applications, such as printing applications where conduits 150 interconnect a stationary ink reservoir to a movable print head, radial peeling forces, such as indicated by arrows 180 in FIG. 1, act to peel conduits 150 about their longitudinal axes. Passing sleeves 130 and their respective conduits 150 through wall 120, as shown in FIGS. 1 and 2, acts to prevent these peeling forces from pulling the respective conduits 150 from their welds and/or sleeves 130 from surface 140 (FIGS. 1 and 3), which could otherwise occur if sleeves 130 and their respective conduits 150 were not passed through the wall 120.

For other embodiments, sleeve 130 is of a material that is transparent to light, such as polyethylene, polypropylene, or the like, while conduit 150 is of a material that absorbs light, such as NORYL, colored polyethylene or polypropylene, or the like. For these embodiments, the slot 134 in sleeve 130 can be omitted because the light can pass through sleeve 130. After passing through sleeve 130, the light is absorbed by conduit 150, causing conduit 150 to heat and subsequently melt. However, the intensity of the light and/or the rate at which light beam 160 is moved can be selected such that melting is localized to the interface between the sleeve and the conduit. Otherwise, the conduit material may be destroyed. Heating of the conduit also causes localized melting of the sleeve at the interface between the sleeve and the conduit that welds the conduit to the sleeve, as described above.

Figure 5:
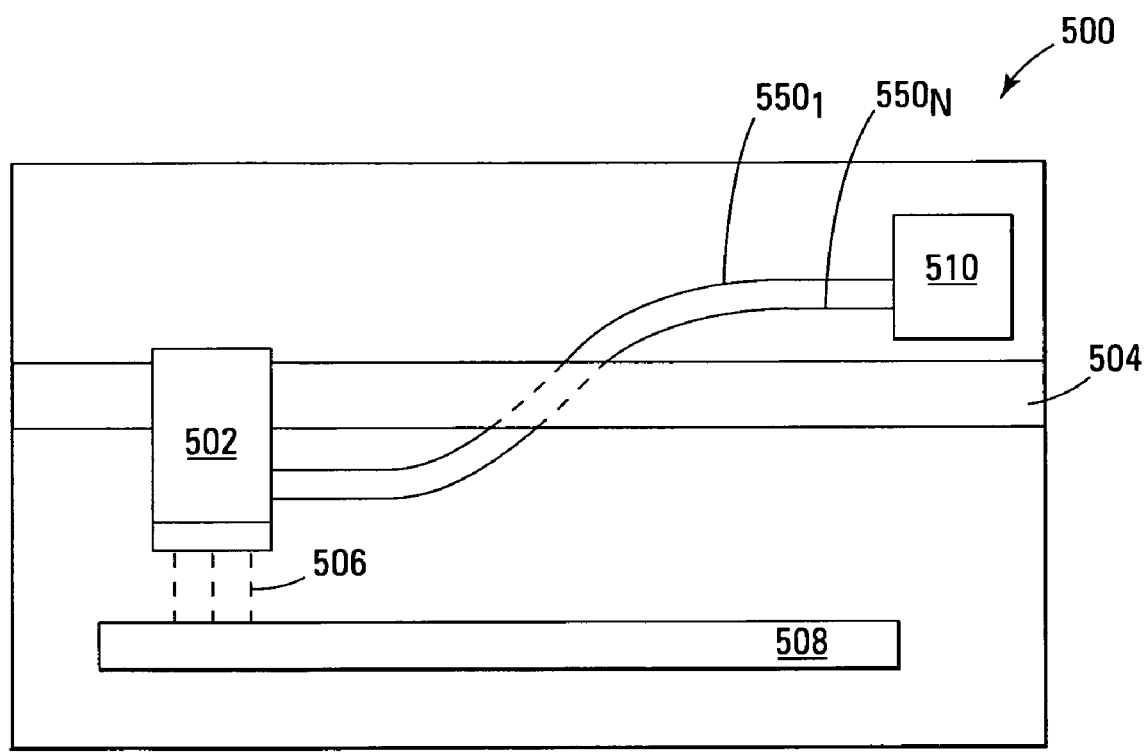
FIG. 5 illustrates an imaging device, according to another embodiment of the present invention.

FIG. 5 illustrates an imaging device 500, such as a printer, according to another embodiment of the present invention. Imaging device 500 has a fluid handling system that includes a fluid-ejection device 502, such as an inkjet print head, fluidly coupled to a stationary marking fluid reservoir 510, e.g., an ink reservoir, by conduits 550. Fluid-ejection device 502 is movably attached to a rail 504. Fluid-ejection device 502 can eject marking fluid droplets 506, such as ink droplets, onto a media sheet 508, e.g., paper, as fluid-ejection device 502 moves across media sheet 508.

For one embodiment fluid reservoir 510 is fixedly attached to printer 500. For another embodiment, each of conduits 550 conveys a different fluid, e.g., a different colored ink, from fluid reservoir 510 to fluid-ejection device 502. For another embodiment, a portion of conduits 510 are fluid delivery lines that respectively convey different fluids to fluid-ejection device 502 and another portion of conduits 550 are fluid return lines for conveying fluids that are not ejected by fluid-ejection device 502 back to fluid reservoir 510.

For various embodiments, fluid-ejection device 502 and fluid reservoir 510 include the elements of the various embodiments of the invention, as described above. Moreover, conduits 550 are connected to fluid-ejection device 502 and fluid reservoir 510 using the methods of the present invention.

Figure 6:
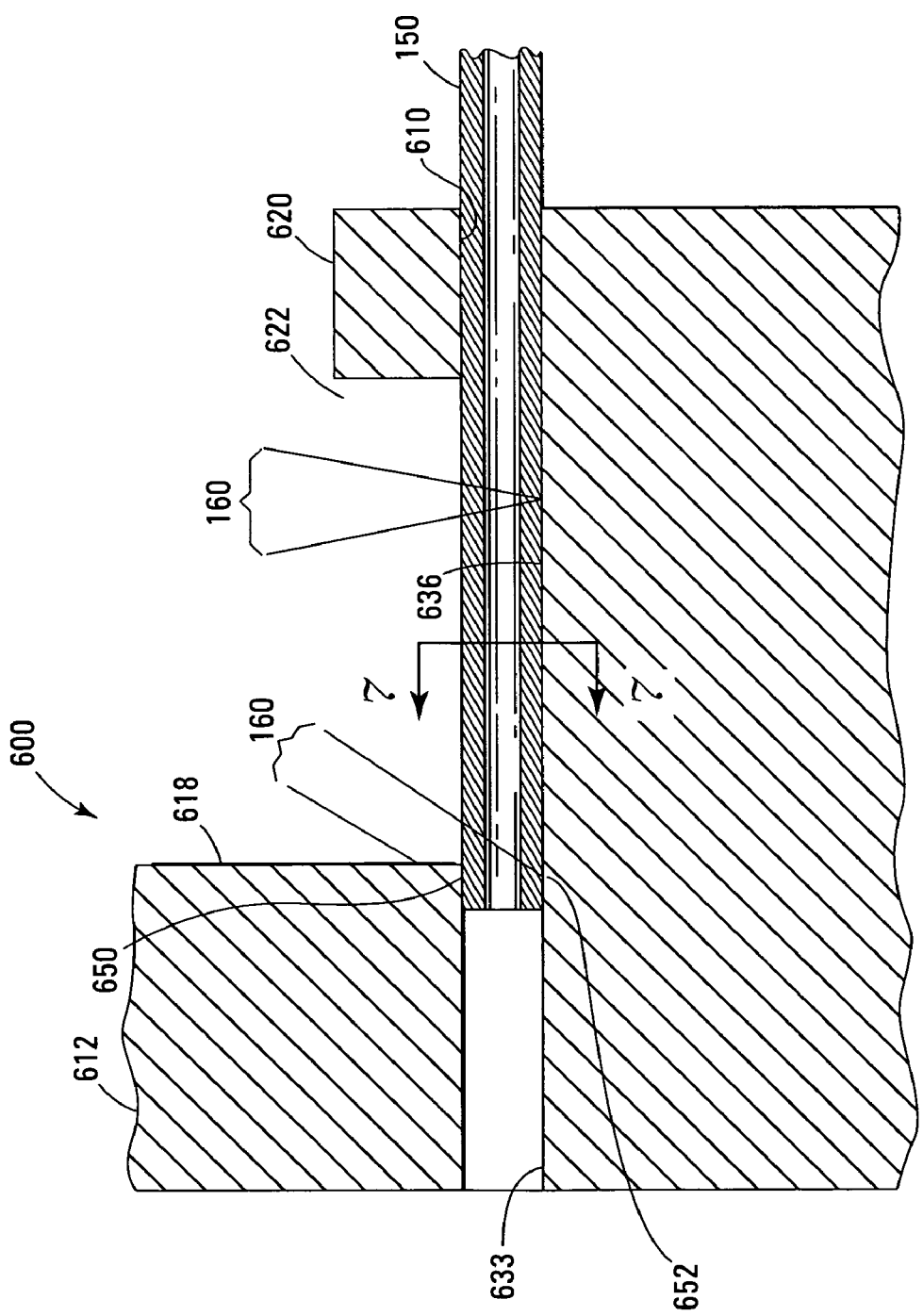
FIG. 6 is a cross-section of a component of a fluid handling system, according to another embodiment of the present invention.

FIG. 6 is a cross-section of a portion of a component 600, according to another embodiment of the invention. For another one embodiment, component 600 is generally as described for component 100 of FIGS. 1-3, except sleeves 130 are removed. Component 600 is of a light absorbing material, and conduits 150 are transparent to light. Each conduit 150 passes through an opening 610 in a sidewall 620 of a trough 622, traverses trough 622, and extends into an internal channel 633. For one embodiment, each of conduits 150 is in frictional engagement with an interior of a corresponding internal channel 633.

Figure 7:
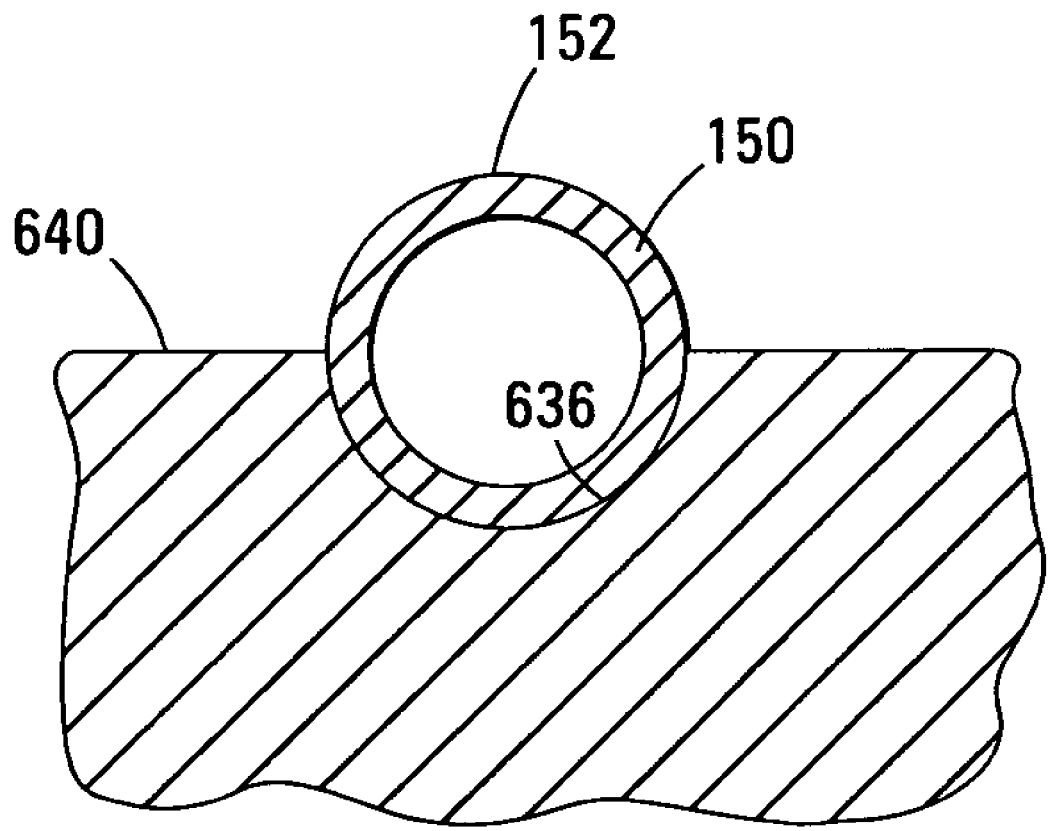
FIG. 7 is a view taken along line 7-7 of FIG. 6, according to another embodiment of the present invention.

As shown in FIG. 7, a view taken along line 7-7 of FIG. 6, each of conduits 150 is partially contained in a groove 636 formed a base 640 of trough 622 for another embodiment. More specifically, a portion of exterior 152 of conduit 150 protrudes from base 640 of trough 622 and is exposed, whereas another portion of exterior 152 is embedded base 640. Note that each groove 636 traverses the base 640 of trough 622 to extend between a wall 612 of component 600 and sidewall 620 of a trough 622 (FIG. 6). Note further that each groove 636 is aligned with an opening 610 in a sidewall 620 of a trough 622 and an internal channel 633. For one embodiment, each groove 636 is substantially perpendicular to wall 612 of component 600 and sidewall 620 of a trough 622.

Conduits 150 are welded to component 600 by directing the light beam 160 into trough 622, through conduits 150, and onto component 600 at a surface of groove 636 (FIG. 6), which absorbs the light and heats. Moreover, the light beam 160 is directed at a surface 618 of a wall 612 of component 600 where the conduits pass into flow passages 633, and component 600 absorbs the light here and heats. Heating of component 600 causes component 600 to be welded to conduits 150, as described above.

For another embodiment, a first portion of light beam 160 is absorbed by wall 612 where conduits 150 pass into flow passages 633. This heats wall 612, causing a first portion 650 of an interior surface of channel 633 to be welded to a corresponding exterior portion of conduit 150, as shown in FIG. 6. Moreover, a second portion of light beam 160 passes through conduit 150 adjacent to surface 618 so that the second portion of light beam 160 is absorbed by component 600 at a second portion 652 of the interior surface of channel 633. This heats component 600, causing the second portion 652 of the exterior surface of channel 633 to be welded to a corresponding exterior portion of conduit 150, as shown in FIG. 6. For this embodiment, conduit 150 may or may not be welded within groove 636. In fact, for some embodiments, trough 622 may be eliminated and conduit 150 may be welded within channel 630, as just described.

Figure 8:
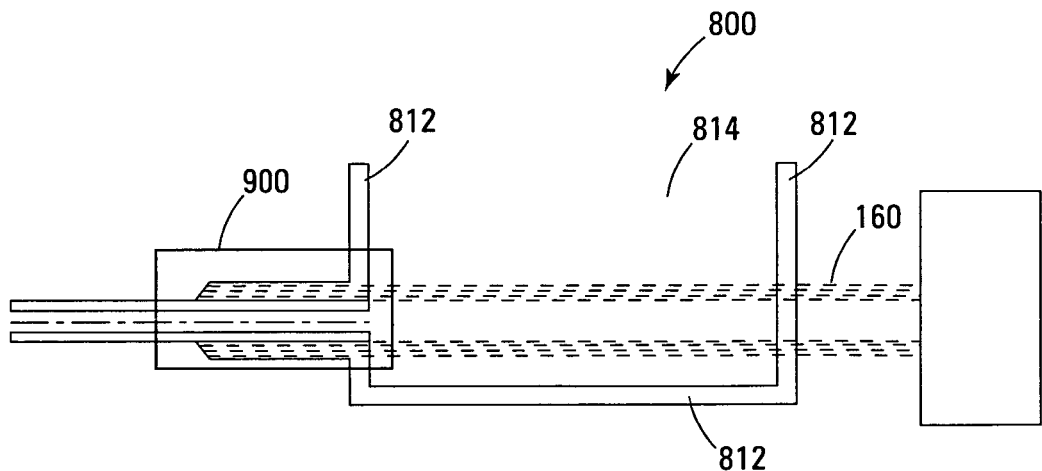
FIG. 8 is a cross-section of a portion of a component of a fluid handling system, according to an embodiment of the present invention.
Figure 9:
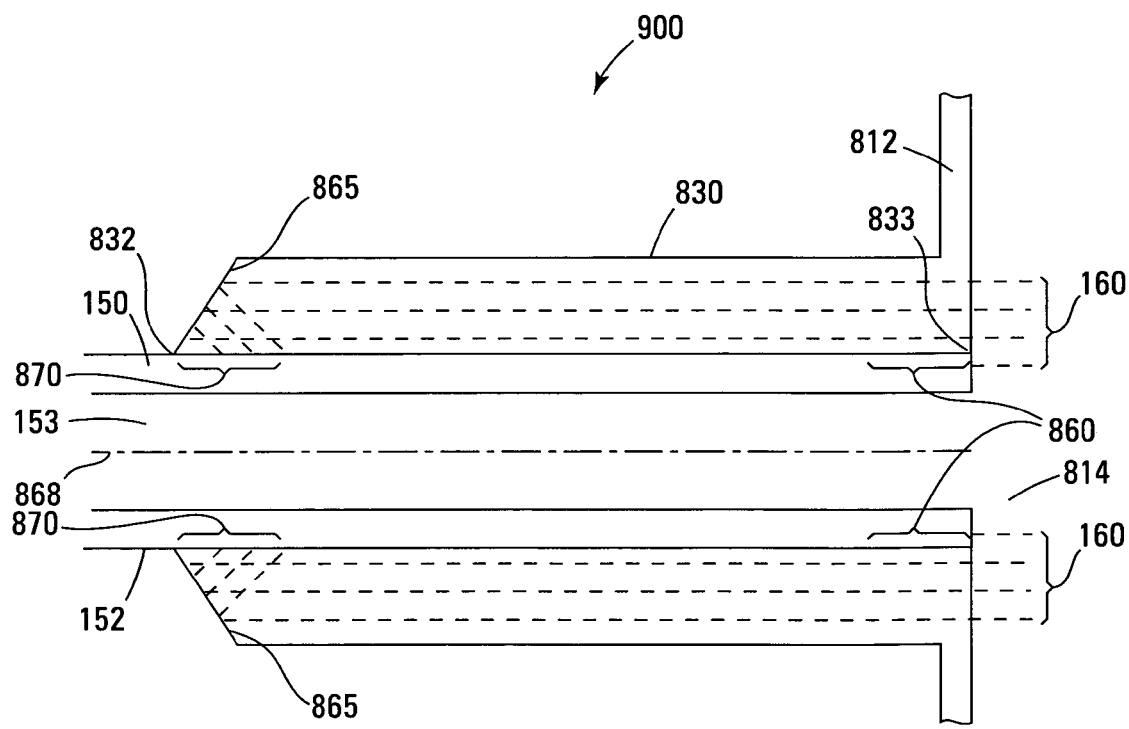
FIG. 9 is an enlarged view of region 900 of FIG. 8.

FIG. 8 is a cross-section of a portion of a component 800 of a fluid handling system, according to another embodiment. FIG. 9 is an enlarged view of region 900 of FIG. 8. Cross-hatching is not included in FIGS. 8 and 9 for clarity. The fluid handling system may be of an imaging device, such as a printer, a medical device, e.g., for dispensing medicines, etc. Component 800 may be a fluid reservoir, such as an ink reservoir, or a fluid-dispensing (or ejection) device, such as a print head. Component 800 includes a wall 812 that separates an interior 814 of component 800 from an exterior of component 800. For one embodiment, wall 812 contains a fluid, such as ink, within interior 814. For one embodiment, wall 812 is of a molded plastic, such as described above for component 100, that is transparent to light.

A sleeve 830 protrudes from a portion of wall 812 (FIG. 9). Sleeve 830 may be formed integrally with wall 812 or may be welded, glued, etc. to wall 812. A longitudinal bore 832 of sleeve 830 aligns with a corresponding internal channel (or fluid flow passage) 833 that passes completely through wall 812, as shown in FIG. 9. For one embodiment, sleeve 830 is transparent to light and may be of the same material as wall 812.

As shown in FIG. 9, conduit 150 is inserted into sleeve 830 such that the exterior 152 of conduit 150 engages an interior portion of sleeve 830, for one embodiment, and such that fluid flow path 153 of conduit 150 passes through internal channel 833 of component 800 and opens into interior 814 of component 800. For one embodiment, conduit 150 is coaxial with sleeve 830 and internal channel 833, as shown in FIG. 9. For another embodiment, conduit 150 is of a plastic that is an absorber of light.

For one embodiment, conduit 150 is welded within sleeve 830 using light beam 160. Light beam 160 is directed through a first portion of the transparent wall 812, through the interior 814 of component 800, and through a second portion of wall 812 that opposes the first portion of wall 812, as shown in FIG. 8. As shown in FIG. 9, a first portion of light beam 160 is absorbed by conduit 150 where conduit 150 opens in to interior 814. This causes conduit 150 to heat adjacent to where conduit 150 opens into interior 814. The heating of conduit 150 causes conduit 150 to be welded to sleeve 833, as described above, at region 860 adjacent to where conduit 150 opens into interior 814.

A second portion of light beam 160 passes axially through the transparent sleeve 830 until it reaches a reflective surface 865 located at a distal end of sleeve 830 that is opposite to where conduit 150 opens into interior 814. For one embodiment, reflective surface 865 may be a reflective foil or plastic that is adhered to or formed integrally with sleeve 830 or may be a silvered coating that is applied onto the distal end of sleeve 830. For another embodiment, reflective surface 865 is angled, relative to a longitudinal axis 868 of sleeve 830 (or of conduit 150), or curved for reflecting the second portion of light beam 160 back through sleeve 830 and onto a portion of exterior 152 of conduit 150 that is located adjacent the distal end of sleeve 830, as illustrated in FIG. 9. Conduit 150, in turn, absorbs the reflected light and heats, causing conduit 150 to be welded to sleeve 832, as described above, at region 870 adjacent the distal end of sleeve 830.

Figure 10:
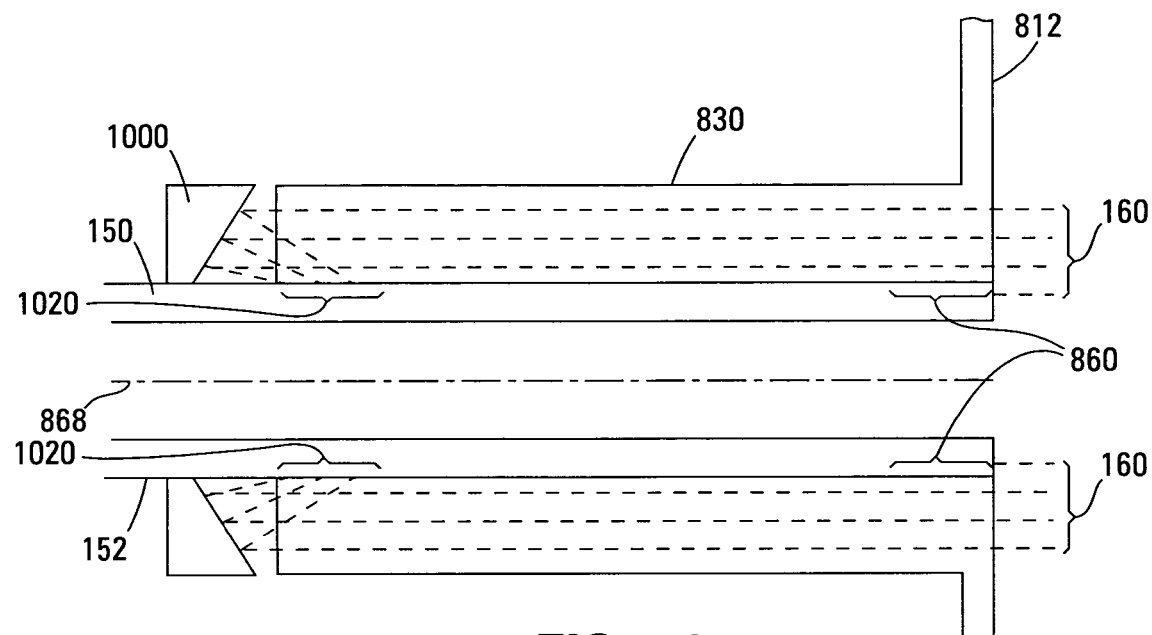
FIG. 10 is an enlarged view of a component of a fluid handling system, according to another embodiment of the present invention.

For another embodiment, a reflector 1000 is located adjacent the distal end of sleeve 830, as shown in FIG. 10, according to another embodiment. For this embodiment, reflector 1000 replaces reflective surface 865 at the distal end of sleeve 830. As shown in FIG. 10, the first component of light beam 160 is absorbed by conduit 150 to form the weld in region 860, as described above in conjunction with FIG. 9. The second component of light beam 160 passes axially through sleeve 830 and exits sleeve 830 at the distal end of sleeve 830. After passing through the distal end of sleeve 830, the second portion of light beam 160 is reflected off of reflector 1000 at an angle, relative to the longitudinal axis 868 of sleeve 830. The reflected light re-enters sleeve 830, passes angularly, to the longitudinal axis 868, through sleeve 830, and onto a portion of exterior 152 of conduit 150 that is located adjacent the distal end of sleeve 830. Conduit 150, in turn, absorbs the reflected light and heats, causing conduit 150 to be welded to sleeve 832, as described above, at region 1020 adjacent the distal end of sleeve 830.

Figure 11:
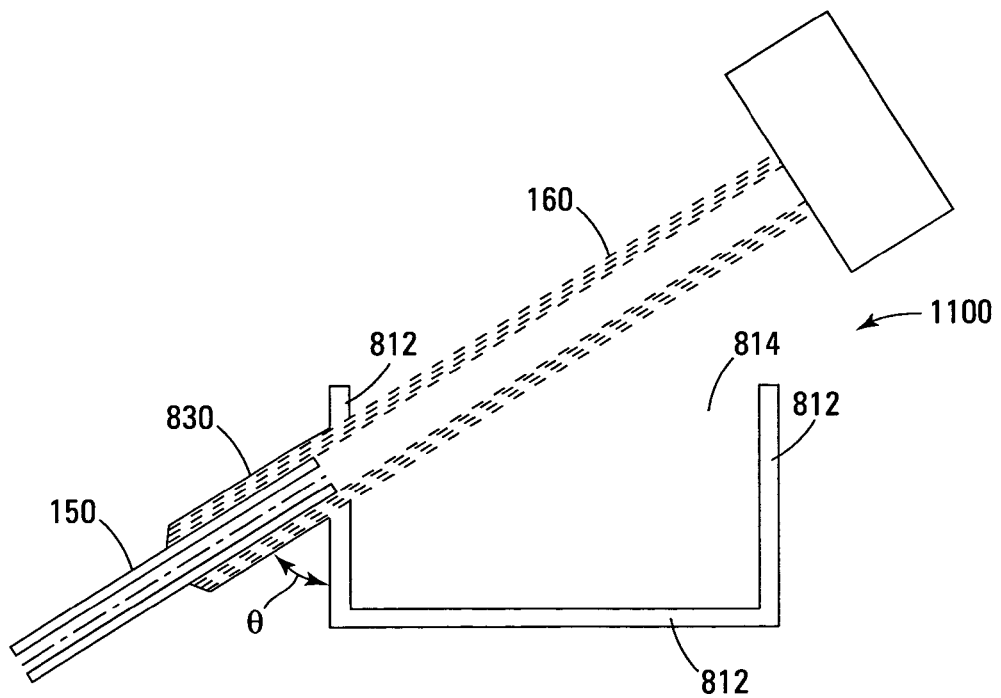
FIG. 11 is a cross-section of a portion of a component of a fluid handling system, according to another embodiment of the present invention.

FIG. 11 illustrates a component 1100, according to another embodiment. For one embodiment, component 1100 is as described above for component 800 of FIGS. 8-10, except that sleeve 830 forms an angle θ with the portion of wall 812 from which sleeve 830 protrudes instead of being substantially perpendicular to wall 812, as shown in FIGS. 8-10. For various embodiments, the angle θ is selected such that the light beam 160 impinges directly onto conduit 150 and sleeve 830 where conduit 150 opens into interior 814, as shown in FIG. 11, so as to avoid directing light beam 160 through the first portion of wall 812 before it arrives at where conduit 150 opens into interior 814, as in FIG. 8. Welding of conduit 150 to sleeve 830 proceeds as described above and illustrated in either FIG. 9 or FIG. 10.

Figure 12:
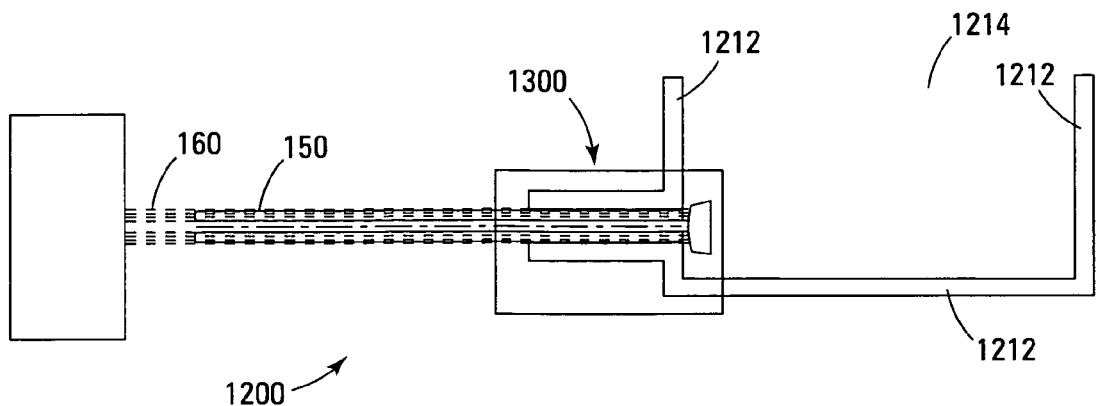
FIG. 12 is a cross-section of a portion of a component of a fluid handling system, according to another embodiment of the present invention.
Figure 13:
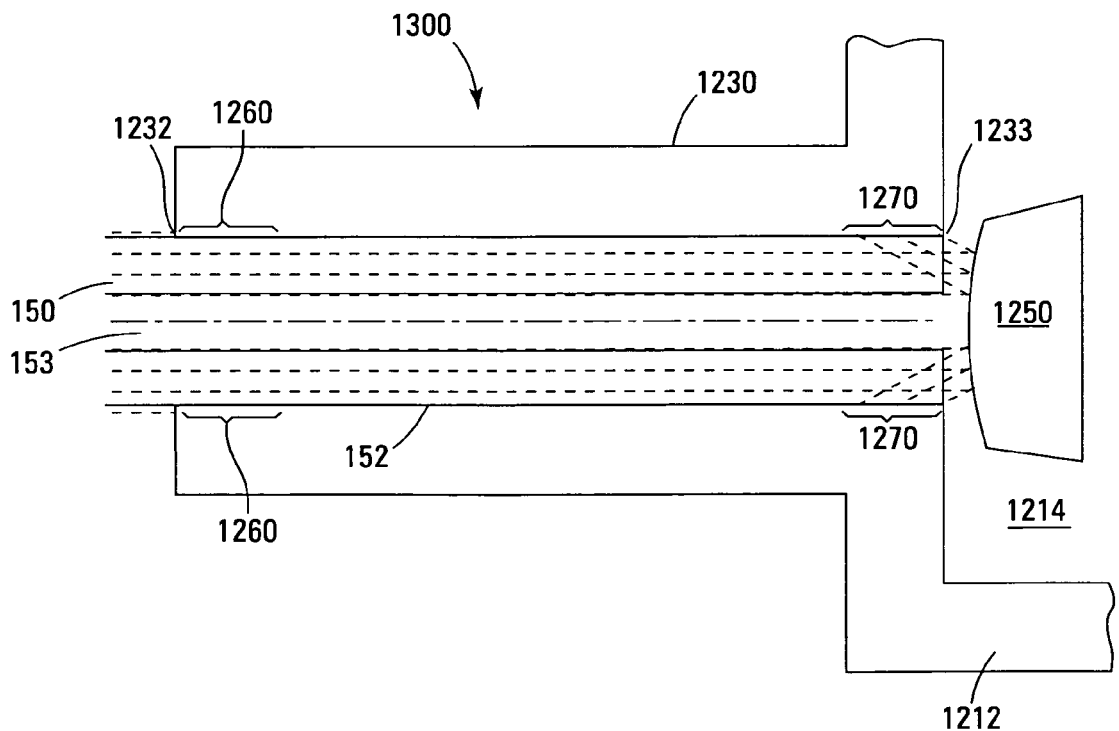
FIG. 13 is an enlarged view of region 1300 of FIG. 12.

FIG. 12 is a cross-section of a portion of a component 1200 of a fluid handling system, according to another embodiment. FIG. 13 is an enlarged view of region 1300 of FIG. 12. Cross-hatching is not included in FIGS. 12 and 13 for clarity. The fluid handling system may be of an imaging device, such as a printer, a medical device, e.g., for dispensing medicines, etc. Component 1200 may be a fluid reservoir, such as an ink reservoir, or a fluid-dispensing (or ejection) device, such as a print head. Component 1200 includes a wall 1212 that separates an interior 1214 of component 1200 from an exterior of component 1200. For one embodiment, wall 1212 contains a fluid, such as ink, within interior 1214. For one embodiment, wall 1212 is of a molded plastic, such as described above for component 100, that absorbs light.

A sleeve 1230 protrudes from a portion of wall 1212 (FIG. 13). Sleeve 1230 may be formed integrally with wall 1212 or may be welded, glued, etc. to wall 1212. A longitudinal bore 1232 of sleeve 1230 aligns with a corresponding internal channel (or fluid flow passage) 1233 that passes completely through wall 1212, as shown in FIG. 13. For one embodiment, sleeve 1230 absorbs light and may be of the same material as wall 1212.

As shown in FIG. 13, conduit 150 is inserted into sleeve 1230 such that the exterior 152 of conduit 150 engages an interior portion of sleeve 1230, for one embodiment, and such that fluid flow path 153 of conduit 150 passes through internal channel 1233 of component 1200 and opens into interior 1214 of component 1200. For one embodiment, conduit 150 is coaxial with sleeve 1230 and internal channel 1233, as shown in FIG. 13. For another embodiment, conduit 150 is of a plastic that is transparent to light.

For one embodiment, conduit 150 is welded within sleeve 1230 using light beam 160. A first portion of the light beam 160 is directed through a distal end of conduit 150 and passes axially through conduit 150, as shown in FIG. 12. As the first portion of the light beam 160 passes axially through conduit 150, a second portion of light beam is directed at and impinges on a distal end of sleeve 1230, as shown in FIG. 13. The second portion of light beam 160 is absorbed by sleeve 1230 at its distal end, causing sleeve 1230 to heat adjacent its distal end. The heating of sleeve 1230 causes sleeve 1230 to be welded to exterior surface 152 of conduit 150, as described above, at region 1260 adjacent the distal end of sleeve 1230, as shown in FIG. 13.

For one embodiment, the first portion of light beam 160 passes through a wall of conduit 150 and flow passage 153 of conduit 150 and exits conduit 150, i.e., the wall and flow passage 153, where conduit 150 opens into interior 1214 and is reflected off of a reflector 1250 located within interior 1214 at an angle to the longitudinal axis of conduit 150 or of sleeve 1230, as shown in FIG. 13. The reflected light re-enters conduit 150 at an angle to the longitudinal axis, passes angularly, to the axial direction, through conduit 150, and onto a portion of sleeve 1230 that is located adjacent where conduit 150 opens into interior 1214, as shown in FIG. 13. Sleeve 1230, in turn, absorbs the reflected light and heats, causing sleeve 1230 to be welded to exterior 152 of conduit 150, as described above, at region 1270 adjacent where conduit 150 opens into interior 1214.

For other embodiments, reflector 1250 may be replaced by a reflective surface (not shown) that is applied to the end of conduit 150 where conduit 150 opens into interior 1214, similar to the reflective surface 865 of sleeve 830 of FIG. 9. For one embodiment, the reflective surface may be a reflective foil or plastic that is adhered to or formed integrally with conduit 150 or may be a silvered coating that is applied onto the end of conduit 150. For another embodiment, the reflective surface is angled or curved for reflecting the first portion of light beam 160 back through conduit 150 and onto the portion of sleeve 1230 that is located adjacent where conduit 150 opens into interior 1214.

For one embodiment, there are multiple sleeves 830 or 1230 each welded to a corresponding conduit 150. For another embodiment, each sleeve 830 or 1230 acts to prevent peeling forces, such as described above and indicated by arrows 180 in FIG. 1, from pulling conduit 150 from its welds to sleeve 830 or 1230 and thereby from component 800 (FIGS. 8-10), component 1100 (FIG. 11), or component 1200 (FIGS. 12 and 13).

CONCLUSION

Although specific embodiments have been illustrated and described herein it is manifestly intended that this invention be limited only by the following claims and equivalents thereof.

What is claimed is:

1. A method of welding a sleeve to a conduit that is disposed within the sleeve, comprising:
    passing a beam of light through a slot in the sleeve that exposes the conduit;
    directing the light through the conduit and onto an interior surface of the sleeve; and
    absorbing the light into the sleeve from the interior surface of the sleeve for heating the sleeve.

2. A method of welding a sleeve to a conduit that is disposed within the sleeve, comprising:
    passing a first portion of a beam of light through a slot in the sleeve that exposes the conduit;
    directing a second portion of the beam of light onto an exterior portion of the sleeve, while passing the first portion of the beam of light through the slot;
    directing the first portion of the beam of light through the conduit and onto an interior surface of the sleeve; and
    absorbing the first portion of the beam of light into the sleeve from the interior surface of the sleeve and absorbing the second portion of the beam of light into the sleeve from the exterior surface of the sleeve for heating the sleeve, wherein heating the sleeve produces molten sleeve material and molten conduit material at an interface between the sleeve and conduit.

3. A method for connecting a conduit to a component of a fluid handling system, comprising:
    disposing the conduit in a sleeve of the component, wherein the sleeve is disposed in a trough formed on an exterior of the component and passes though a sidewall of the trough and extends into a wall of the component that separates an interior of the component from an interior of the trough and that is opposite the sidewall of the trough, wherein the sleeve aligns with a channel passing completely through the wall of the component;
    disposing the conduit within the sleeve; and
    welding the conduit to an interior of the sleeve using a beam of light.

4. The method of claim 3, wherein welding the conduit to the interior of the sleeve comprises:
    passing the beam of light through a slot in the sleeve that exposes the conduit;
    directing the beam of light through the conduit and onto an interior surface of the sleeve; and
    absorbing the light into the sleeve from the interior surface of the sleeve for heating the sleeve, wherein heating the sleeve produces molten sleeve material and molten conduit material at an interface between the sleeve and conduit.

5. The method of claim 4, further comprising directing the beam of light into the trough before passing the beam of light through the slot.

* * * * *